United States Patent [19]
Adamisin et al.

[11] Patent Number: 5,803,045
[45] Date of Patent: Sep. 8, 1998

[54] AIR INTAKE SLIDE THROTTLE FOR AN INTERNAL COMBUSTION ENGINE

[75] Inventors: David Wayne Adamisin, Northville; Philip Damian Cierpial, Detroit; Raymond Alan Kach, Farmington Hills, all of Mich.

[73] Assignee: Ford Global Technologies, Inc., Dearborn, Mich.

[21] Appl. No.: 766,698

[22] Filed: Dec. 13, 1996

[51] Int. Cl.[6] .............................. F02D 9/12; F02B 31/00; F02M 3/00
[52] U.S. Cl. ........................ 123/336; 123/308; 123/339.1
[58] Field of Search .................................... 123/336, 302, 123/308, 342, 337, 339.1, 339.25–339.28

[56] References Cited

U.S. PATENT DOCUMENTS

| | | |
|---|---|---|
| 899,109 | 9/1908 | Heitger . |
| 1,159,985 | 11/1915 | Orlopp . |
| 1,699,215 | 1/1929 | Wheeler . |
| 4,064,857 | 12/1977 | Williams ................................. 123/141 |
| 4,124,012 | 11/1978 | Fuller, Jr. ............................ 123/198 F |
| 4,401,068 | 8/1983 | Bristol ................................. 123/198 F |
| 4,938,191 | 7/1990 | Oldani et al. ............................ 123/432 |
| 5,454,357 | 10/1995 | Elder ....................................... 123/337 |
| 5,592,916 | 1/1997 | Stockhausen et al. ................... 123/308 |

*Primary Examiner*—Raymond A. Nelli
*Assistant Examiner*—Hieu T. Vo
*Attorney, Agent, or Firm*—Donald A. Wilkinson

[57] ABSTRACT

A throttle for an internal combustion engine wherein intake runners (18) include slots (24) through which a slide throttle plate (26) is mounted. The throttle plate includes openings (28) selectively aligned with the runners (18) by an actuator (32) to control the air flow into the engine intake ports (14). Actuation back and forth across the runners (18) can provide for flow control as well as port deactivation, while a throttle plate (226) configured for up and down motion relative to the intake runners (218) can provide for tumble port flow control.

15 Claims, 3 Drawing Sheets

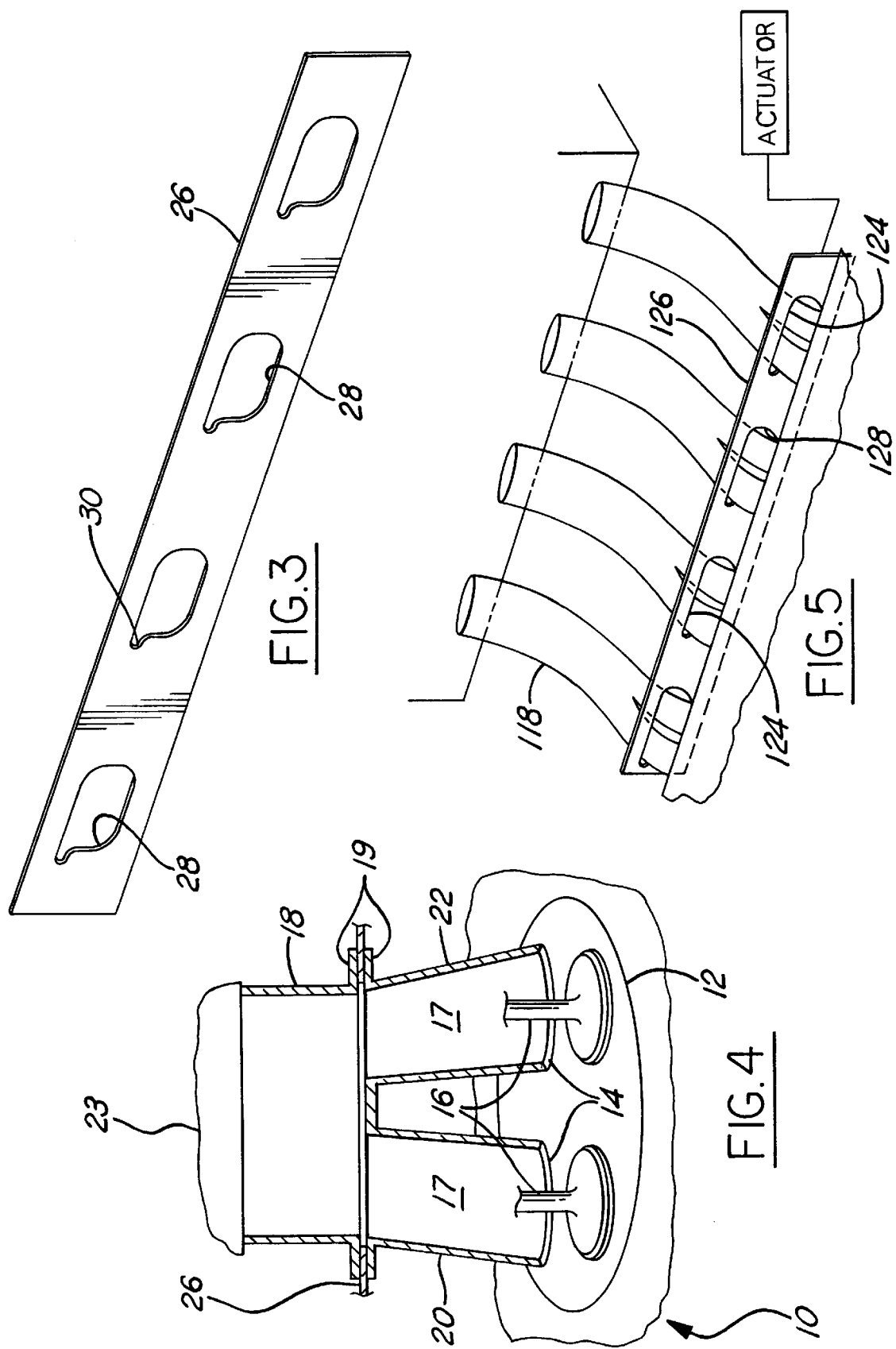

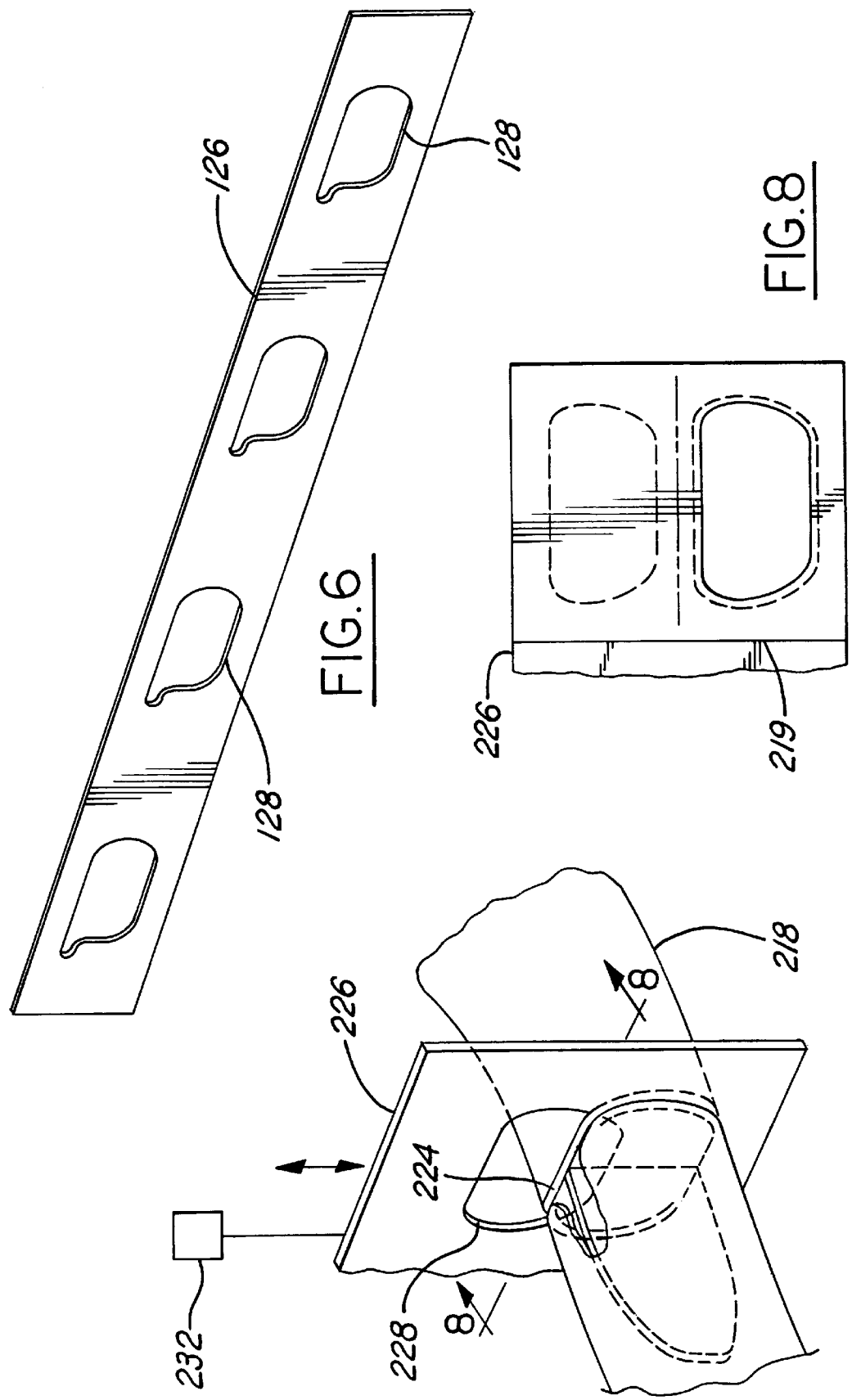

AIR INTAKE SLIDE THROTTLE FOR AN INTERNAL COMBUSTION ENGINE

FIELD OF THE INVENTION

The present invention relates to the air intake systems for internal combustion engines and more particularly to throttle valve control for the intake systems.

BACKGROUND OF THE INVENTION

Conventional air intake systems for an internal combustion engine employ a single throttle body to control the flow of air into the engine cylinders, whether for a two or four valve per cylinder engine. They typically employ butterfly or barrel valves for this. With increased emphasis on better fuel economy and emissions, some have tried to better control the intake system by combining the above noted system on four valve engines with port deactivation through separate and individual two position shut-off valves in one of the two intake runners for each cylinder.

Others have tried to further improve overall performance by providing port throttling, where individual port throttles (at least one for each cylinder), again typically butterfly valves but also barrel valves, control the flow into the cylinders, with one valve for each cylinder being a shut-off valve for one of the two intake runners. This port throttling provides better control, but adds significantly to the cost and complexity of the system. Accordingly, both of these arrangements require multiple valves controlling the flow into each cylinder and are generally limited in that the shut-off valves are two position for simplicity and cost reasons.

Therefore, a simple and inexpensive yet reliable system is desired that can provide port deactivation control, and engine throttling control, or tumble port control and engine throttling control in a single throttle assembly, thereby improving engine performance.

SUMMARY OF THE INVENTION

In its embodiments, the present invention contemplates an intake system for a multi-cylinder internal combustion engine, having at least one intake port for each cylinder. The intake system includes a plurality of primary intake runners each having an upstream end and a downstream end and an air flow passage therethrough, adapted to extend from the upstream end to the intake ports at the downstream end, and a slot spaced from either end of the primary runner, extending at least partially around its periphery. A generally flat throttle plate is mounted in and extends across the slots, with the throttle plate also including a plurality of openings therethrough operatively engaging the slots. The intake system also includes actuator means for axially sliding the throttle plate to a plurality of positions relative to the primary intake runners whereby the plurality of openings will selectively block off portions of the intake runners when slid by the actuator.

Accordingly, an object of the present invention is to employ a slide throttle valve for individual port throttles which can provide port deactivation or tumble port control as well as engine throttling.

An advantage of the present invention is that a single throttle plate is used to both throttle the engine, control idle and to provide either port deactivation or intake manifold tumble port control for each bank of cylinders in an engine.

A further advantage of the present invention is reduced cost over prior technology because it provides both throttle control and burn rate control with one system, eliminating the need for either a central throttle body or, when individual runner throttles (port throttles) are employed, separate intake manifold runner controls for each cylinder.

BRIEF DESCRIPTION OF THE DRAWINGS

FIG. 3 is a perspective schematic view of a slide throttle plate in accordance with the present invention;

FIG. 4 is a side cross-sectional schematic view of the slide throttle plate and intake runners for a single one of the engine cylinders in accordance with the present invention;

FIG. 5 is a view similar to FIG. 1, but illustrating a second embodiment of the present invention;

FIG. 6 is a view similar to FIG. 3, but illustrating the second embodiment of the present invention;

FIG. 7 is a view similar to FIG. 2, but illustrating a third embodiment of the present invention; and FIG. 8 is a sectional view taken along line 8—8 in FIG. 7, illustrating a flange on the intake runner.

DETAILED DESCRIPTION OF THE PREFERRED EMBODIMENTS

Figure 1:
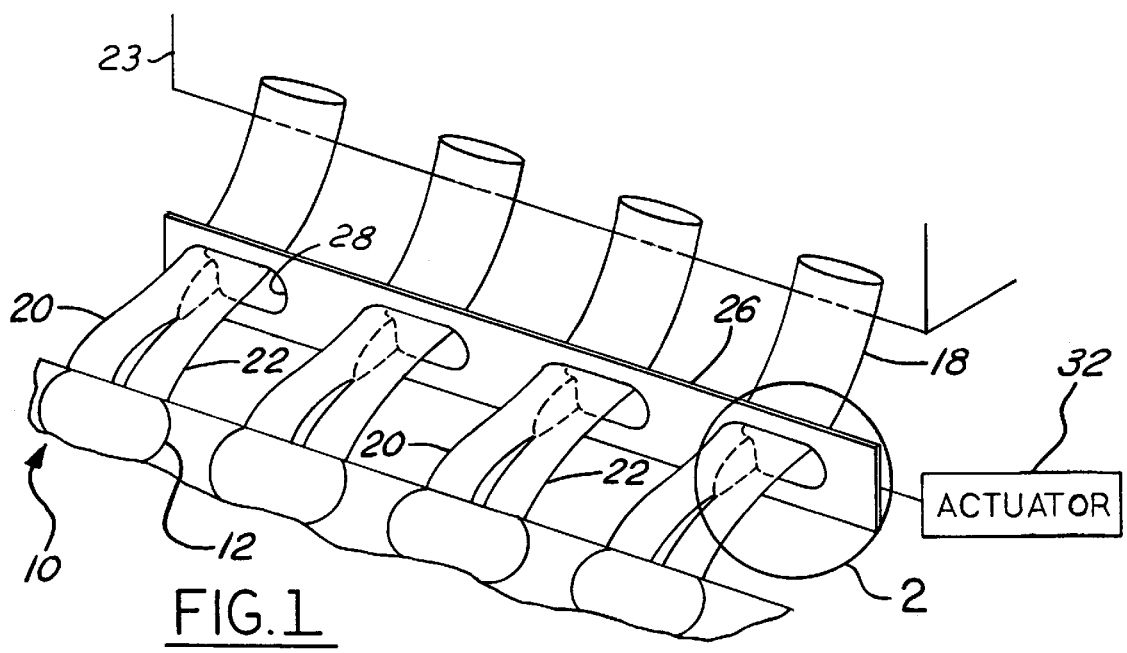
FIG. 1 is a schematic perspective view of a portion of an air intake system in accordance with the present invention.

FIGS. 1–4 illustrate a first embodiment of the present invention wherein a typical internal combustion engine 10 includes four cylinders 12, each having two intake ports 14. The two intake ports 14 are configured for a typical three or four valve per cylinder engine. While this best mode illustrates a four cylinder engine with two intake valves per cylinder, the present invention is also applicable to different configurations of engines with different numbers of cylinders. For instance, FIG. 1 can also be viewed as one bank of a V-8 engine with a similar throttle arrangement employed on the other bank.

The flow through the intake ports 14 is controlled by conventional intake valves 16. Connected to the pair of intake ports 14 in each cylinder are passages 17 formed by a first 20 and a second 22 downstream portion of a primary intake runner 18. The upstream end of each of the runners 18 connects to an intake plenum 23. The air flows through the passages 17 from the upstream end at the intake plenum 23 to the ports 14 at the downstream end of the runners 18.

At a juncture where the first and second portions 20, 22 first separate, for each runner 18, is a slot 24 around the periphery of that runner 18, dividing it into an upstream section and a downstream section. A pair of flanges 19 surround each of the slots 24, one on the upstream section and the other on the downstream section. The flanges 19 are illustrated in FIG. 4, but are not shown in FIGS. 1 and 2, for clarity.

Mounted in these slots 24, between the flanges 19 is a slide throttle plate 26. The throttle plate 26 is a flat member which, for example, can be made out of metal foil to facilitate the use of a drum take-up device to move the throttle plate 26 for opening and closing the throttle. The throttle plate 26 includes four openings 28, one for each primary runner 18. The openings 28 are generally oblong openings, being oblong in the direction of movement of the throttle plate 26. The openings 28 also include an idle notch portion 30 extending out from the oblong portion.

An actuator 32 is connected to the throttle plate 26, and can slide the throttle plate 26 back and forth relative to the primary runners 18, thereby simultaneously moving each of the openings 28 relative to its respective runner 18, for a given bank of cylinders. Back and forth motion as used herein means that the motion is directed from one runner to the next along a given bank of cylinders, as is shown by the arrows in FIGS. 1, 2 and 4. The actuator 32 is in communication with a conventional on-board computer, not shown, which controls the activation of the actuator 32.

During operation, then, the actuator 32 will slide the throttle plate 26 back and forth to various positions depending upon the engine operating conditions. During slow idle, for example, the actuator 32 will pull the throttle plate 26 towards itself so that only some of the idle notch portion 30 of each of the opening 28 is aligned with its corresponding second primary runner portion 22, and none of the opening is aligned with the first primary runner portion 20. In this way, the air flow to one of the two intake ports 14 (conventionally referred to as the secondary intake valve) is cut off, effectively deactivating this intake valve 16, and the air flow to the other port 14 (referred to as the primary intake valve) is restricted. A fuel injector, not shown, is also deactivated for this port by the on-board computer, but this is the same process as with conventional port deactivation arrangements, and so will not be discussed further herein. The actuator 32 can now adjust the idle air needed by small movements back and forth. The narrow idle notch 30 provides higher resolution and thus more precision in controlling the idle air flow, for a given actuator, than the oblong openings 28, allowing for a larger axial movement of the throttle plate 26 to obtain a given incremental change in air flow. A conventional idle by-pass device, then, is no longer needed and is eliminated for this design.

Figure 2:
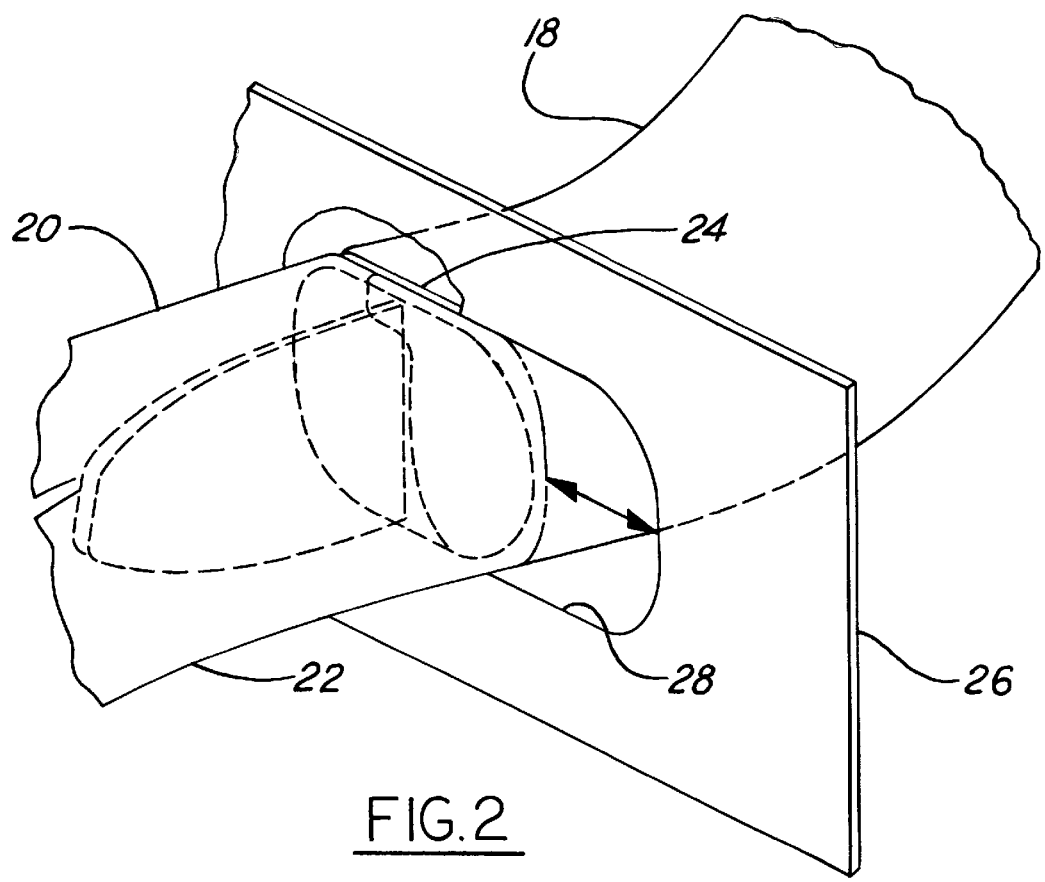
FIG. 2 is an enlarged view taken from encircled area 2 in FIG. 1.

For the engine operating range above idle, but below some mid-range limit, for example 3000 to 3500 RPM with medium to low load, the actuator 32 will slide the throttle plate 26 to the extent that it varies the alignment of each of the openings 28 in front of the primary runner second portion 22, with the second intake valve still effectively deactivated. FIG. 2 illustrates a position near the upper end of this range with the primary runner second portion 22 fully open to air flow but the primary runner first portion 20 still deactivated.

For the engine operating range for high load and/or high engine speed conditions, the actuator 32 then slides the throttle plate 26 farther away from itself to where each of the openings 28 align fully with the primary runner second portion 22 and also partially or fully with the primary runner first portion 20. In these conditions, the second intake valve 16 is effectively activated for these high power demand engine conditions, permitting wide open throttle performance without losses in flow.

Accordingly, this air intake throttle system will allow for both precise control of the intake air throttling and also port deactivation with a single throttle plate 26 and actuator 32 per bank of cylinders.

FIGS. 5 and 6 illustrate a second embodiment of the present invention. In this embodiment, similar elements are similarly designated with the first embodiment, while changed elements are designated with a 100 series number. The slots 124 are now located downstream farther along the primary intake runners 118, having the openings 128 extended along the length of the plate 126 to account for the spacing, with the result being that the throttle plate 126 is located closer to the intake ports. This can provide improved air flow characteristics, although the throttle plate 126 now extends through and must be sealed around more surface area of the primary intake runners 118. The operation for this embodiment is the same as with the first embodiment.

FIGS. 7 and 8 illustrate a third embodiment of the present invention, where similar elements are similarly designated with the first embodiment, while changed elements are designated with a 200 series number. In this embodiment, the slide throttle plate 226 is configured to slide up and down rather than back and forth as in the first embodiment. The up and down motion as used herein means that the motion is directed along a given bank of cylinders, but generally normal to the back and forth direction of the first embodiment, as indicated by the arrows in FIG. 7. The openings 228 are changed to account for this different direction of sliding motion. While an idle notch is not illustrated in this embodiment, it may be employed in a similar fashion as in the first embodiment. The openings 228 do taper from top to bottom in order to provide some increased resolution at low engine load conditions. The actuator 232 now controls the up and down motion of the throttle plate 226 for intake air flow control. The flanges 219 on the runner 218 about the slots 224, (the upstream flange illustrated in FIG. 8), now extend farther vertically to provide sealing that accounts for the changed direction of motion of the throttle plate 226. FIG. 7 does not illustrate the flanges 219, for clarity.

While this embodiment eliminates the port deactivation feature of the intake system, it allows for accommodating air flow for a tumble port type of arrangement. The tumble port control comes because the openings 228 can be adjusted to only open partially along the top of the runners 218, causing the air flowing through the openings 218 to begin a tumbling type of flow pattern just downstream of the throttle plate 226, which carries in to the cylinder ports. This tumbling type of flow pattern is well known in the art to improve combustion within the cylinders, thus improving overall engine performance.

While certain embodiments of the present invention have been described in detail, those familiar with the art to which this invention relates will recognize various alternative designs and embodiments for practicing the invention as defined by the following claims.

We claim:

1. An intake system for a multi-cylinder internal combustion engine, having at least one intake port for each cylinder, the intake system comprising:

a plurality of primary intake runners each having an upstream end and a downstream end and an air flow passage therethrough, adapted to extend from the upstream end to the intake ports at the downstream end, and a slot spaced from either end of the primary runner, extending at least partially around its periphery;

a generally flat throttle plate mounted in and extending across the slots, with the throttle plate also including a plurality of openings therethrough operatively engaging the slots, and with each of the openings in the throttle plate having an idle slot extending therefrom; and actuator means for axially sliding the throttle plate to a plurality of positions relative to the primary intake runners whereby the plurality of openings will selectively block off portions of the intake runners when slid by the actuator.

2. The intake system of claim 2 wherein each of the plurality of primary intake runners splits into a first downstream portion and a second downstream portion, with the slots for each primary intake runner being immediately upstream of the first and second downstream portions.

3. The intake system of claim 1 wherein each of the plurality of primary intake runners includes a juncture at which the intake runner splits into a first downstream portion and a second downstream portion, with the slots for each primary intake runner being downstream of the juncture.

4. The intake system of claim 1 further including an intake plenum, with the upstream ends of primary runners extending to the intake plenum.

5. The intake system of claim 1 wherein the direction of sliding motion of the throttle plate is back and forth between the intake runners.

6. The intake system of claim 5 wherein each of the plurality of primary intake runners includes a juncture at which the intake runner splits into a first downstream portion and a second downstream portion.

7. The intake system of claim 6 wherein the openings in the throttle plate are shaped such that the throttle plate is slidable by the actuator means to cause the passage in one downstream portion for each of the intake runners to be completely blocked by the throttle plate, thereby providing port deactivation of the one downstream portion for each runner.

8. An internal combustion engine for use with a vehicle comprising:

a plurality of cylinders including at least one intake port opening into each cylinder;

a plurality of primary intake runners each having an upstream end and a downstream end and an air flow passage therethrough, extending from the upstream end to the intake ports at the downstream end, and a slot spaced from either end of the primary runner, extending at least partially around its periphery;

a generally flat throttle plate mounted in and extending across the slots, with the throttle plate also including a plurality of openings therethrough operatively engaging the slots, and with each of the openings in the throttle plate including an idle slot extending therefrom; and actuator means for axially sliding the throttle plate to a plurality of positions relative to the primary intake runners whereby the plurality of openings will selectively block off portions of the intake runners when slid by the actuator.

9. The engine of claim 8 further including an intake plenum, with the upstream ends of primary runners extending to the intake plenum.

10. The engine of claim 8 wherein the plurality of cylinder is four cylinders arranged in an in-line configuration.

11. The engine of claim 8 wherein each of the plurality of primary intake runners includes a juncture at which the intake runner splits into a first downstream portion and a second downstream portion, with the slots for each primary intake runner being immediately upstream of the juncture.

12. An intake system for a multi-cylinder internal combustion engine, having at least one intake port for each cylinder, the intake system comprising:

a plurality of primary intake runners each having an upstream end and a downstream end and an air flow passage therethrough, with each of the primary intake runners splitting into a first downstream portion and a second downstream portion, adapted to extend from the upstream end to the intake ports at the downstream end, and each of the primary intake runners having a slot spaced from either end of the primary runner immediately upstream of the first and second downstream portions, extending at least partially around the periphery of each of the primary intake runners;

a generally flat throttle plate mounted in and extending across the slots, with the throttle plate also including a plurality of openings therethrough operatively engaging the slots; and actuator means for axially sliding the throttle plate to a plurality of positions relative to the primary intake runners whereby the plurality of openings will selectively block off portions of the intake runners when slid by the actuator.

13. An intake system for a multi-cylinder internal combustion engine, having at least one intake port for each cylinder, the intake system comprising:

a plurality of primary intake runners each having an upstream end and a downstream end and an air flow passage therethrough, adapted to extend from the upstream end to the intake ports at the downstream end, with each of the primary intake runners including a juncture at which the intake runner splits into a first downstream portion and a second downstream portion, and with each of the primary intake runners including a slot spaced from either end of the primary runner downstream of the juncture, extending at least partially around its periphery;

a generally flat throttle plate mounted in and extending across the slots, with the throttle plate also including a plurality of openings therethrough operatively engaging the slots; and actuator means for axially sliding the throttle plate to a plurality of positions relative to the primary intake runners whereby the plurality of openings will selectively block off portions of the intake runners when slid by the actuator.

14. An internal combustion engine for use with a vehicle comprising:

a plurality of cylinders including at least one intake port opening into each cylinder;

a plurality of primary intake runners each having an upstream end and a downstream end and an air flow passage therethrough, extending from the upstream end to the intake ports at the downstream end, with each of the plurality of primary intake runners including a juncture at which the intake runner splits into a first downstream portion and a second downstream portion, and with each primary intake runner including a slot spaced from either end of the primary runner immediately upstream of the juncture, extending at least partially around its periphery;

a generally flat throttle plate mounted in and extending across the slots, with the throttle plate also including a plurality of openings therethrough operatively engaging the slots; and actuator means for axially sliding the throttle plate to a plurality of positions relative to the primary intake runners whereby the plurality of openings will selectively block off portions of the intake runners when slid by the actuator.

15. The engine of claim 11 wherein the openings in the throttle plate are shaped such that the throttle plate is slidable by the actuator means to cause the passage in one downstream portion for each of the intake runners to be completely blocked by the throttle plate, thereby providing port deactivation of the one downstream portion for each runner.

* * * * *